United States Patent
Kobayashi

(10) Patent No.: US 7,154,483 B2
(45) Date of Patent: Dec. 26, 2006

(54) TOUCH PANEL DEVICE

(75) Inventor: Hiroshi Kobayashi, Kawagoe (JP)

(73) Assignee: Pioneer Corporation, Tokyo (JP)

( * ) Notice: Subject to any disclaimer, the term of this patent is extended or adjusted under 35 U.S.C. 154(b) by 354 days.

(21) Appl. No.: 10/422,761

(22) Filed: Apr. 25, 2003

(65) Prior Publication Data

US 2003/0222858 A1    Dec. 4, 2003

(30) Foreign Application Priority Data

May 28, 2002  (JP) .............................. 2002-153227

(51) Int. Cl.
G09G 5/00    (2006.01)
(52) U.S. Cl. ...................... 345/173; 345/174; 345/178; 345/179; 178/18.01; 178/18.03; 178/18.09
(58) Field of Classification Search ........ 345/173–178, 345/179; 178/18.01–18.09
See application file for complete search history.

(56) References Cited

U.S. PATENT DOCUMENTS 5,565,894 A * 10/1996 Bates et al. ................ 345/178
5,627,567 A * 5/1997 Davidson .................... 345/173
5,818,451 A * 10/1998 Bertram et al. ............. 715/840
5,877,751 A * 3/1999 Kanemitsu et al. ......... 345/173
6,067,081 A * 5/2000 Hahlganss et al. .......... 345/173
6,256,021 B1 * 7/2001 Singh ......................... 345/173

* cited by examiner

Primary Examiner—Richard Hjerpe
Assistant Examiner—Jennifer T. Nguyen
(74) Attorney, Agent, or Firm—Drinker Biddle & Reath LLP

(57) ABSTRACT

A touch panel device includes a screen that has a plurality of display areas in a first layer, and a plurality of touch areas in a second layer. The second layer lies over the first layer. One touch area is superposed over one display area. The touch area is generally larger than the display area. A position of each touch area is slightly offset from the corresponding display area, depending upon a relative positional relationship between the touch panel device and a user of the touch panel device. The offsetting may be determined based on ergonomics in order to effectively prevent an erroneous operation of a user to the touch panel device. The user is a vehicle driver if the touch panel device is used in a car navigation machine.

15 Claims, 8 Drawing Sheets

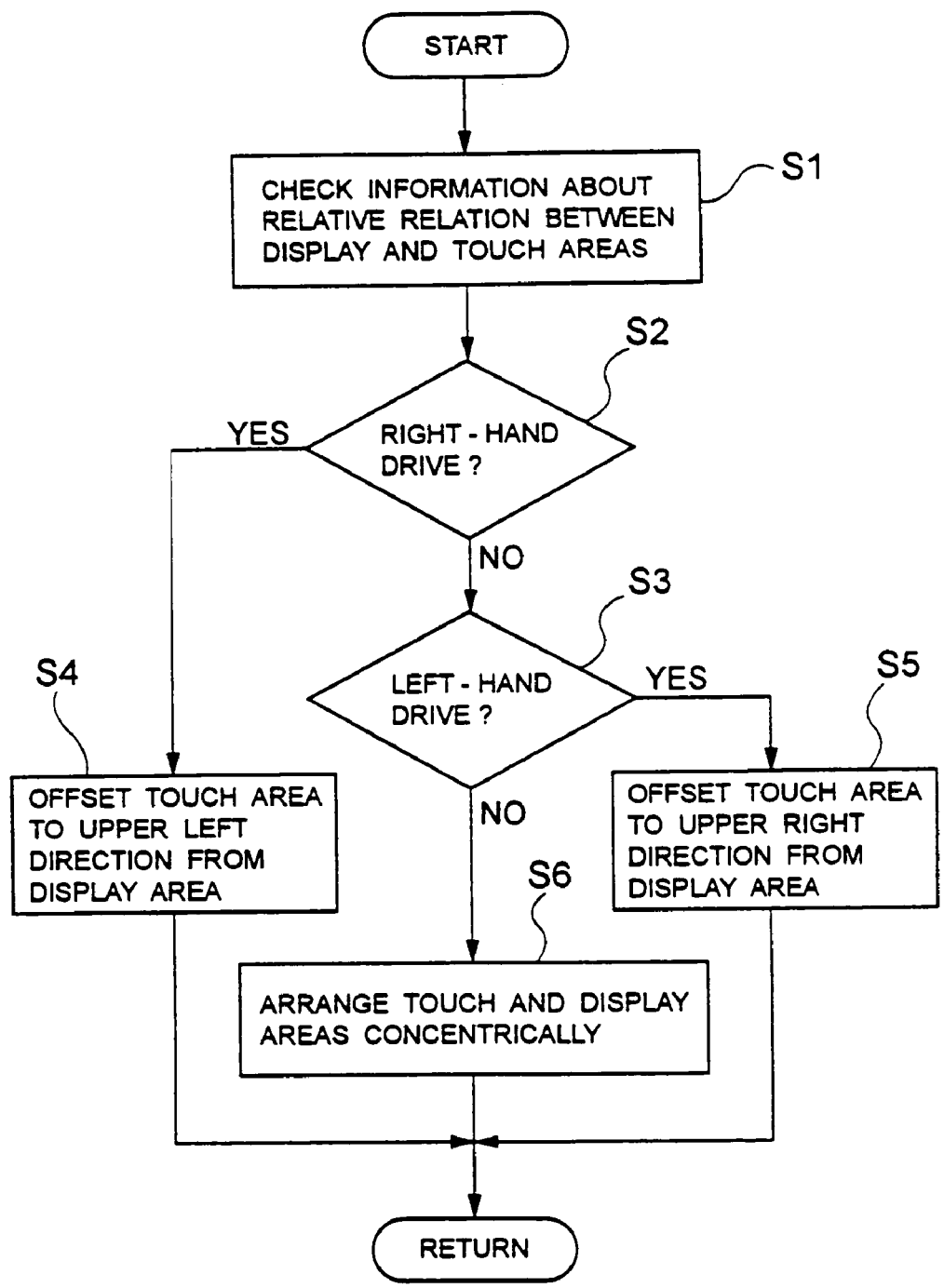

TOUCH PANEL DEVICE

BACKGROUND OF THE INVENTION

1. Field of the Invention

The present invention relates to a touch panel device to be used as a display/input device for an electronic device such as a car navigation apparatus.

2. Description of the Related Art

In recent times, various electronic devices, such as an ATM and a car navigation apparatus, are equipped with a panel device which can permit a panel (or screen) to be used for data/information display and data/information entry. This type of panel device is usually referred to as "touch panel device." Use of the touch panel device is particularly advantageous to a car navigation apparatus because a large amount of data/information should be displayed and a large amount of data/information should be input into the display panel but the size of the display panel screen is relatively small. Here, the term "data/information" includes any numbers, letters, images, signs and moving picture which can be displayed on the screen.

In general, a touch panel includes a display layer and a touch sensor layer laminated over the display layer. The touch sensor layer includes transparent resistance layers and electrodes. The display layer is, for example, an LCD or an organic electroluminescent (EL) display. Data/information entry buttons or icons (referred to as "operation buttons") are displayed on the display layer. An area used to display each data/information entry button is called a "display area." Thus, a plurality of display areas are usually defined on the display layer. If the touch sensor layer is a pressure-sensitive resistance-embedded layer (resistance film type), the touch sensor layer includes two transparent resistance layers facing each other. Each transparent resistance layer is made of a glass sheet or plastic film on which an ITO (Indium Tin Oxide) is deposited.

The principle of operation of the touch panel device will be described briefly. When a user presses one of the operation buttons displayed on the display layer via the touch sensor layer with his finger, a pressure applied on the button changes an electric resistance in the touch sensor layer at the position corresponding to the pressed button. A controller of the touch panel device detects the pressed position (touched area) on the touch sensor layer when the resistance changes in the touch sensor layer. The controller then determines the relationship between the touched position and the location of the pressed button so as to determine which button is pressed.

FIG. 1 of the accompanying drawings illustrates a configuration of a display screen of a conventional touch panel device used in a car navigation apparatus. In this drawing, reference numeral 10 designates the display screen of the touch panel device. Each solid-line rectangle 11 designates a display area on the display layer of the touch panel device. The display areas 11 show selectable operations (menu) of the car navigation apparatus. Each broken-line rectangle 12 designates a touch area on the touch sensor layer. The touch area 12 is larger than the display area 11. The touch area 12 concentrically overlaps the corresponding display area 11 corresponding to the display area of the display layer. When a user presses a certain touch area 12 with his finger, the controller of the touch panel device determines that the operation button displayed in the corresponding display area 11 is pressed. The solid line rectangle for the display area 11 is visible to the user, but the broken line rectangle for the touch area 12 is not visible.

The position and size of each of the display areas 11 and touch areas 12 of the touch panel device can be arbitrarily determined by software control of the touch panel device. The touch panel device can present a plurality of choice or menu screens on the single display screen. The user can touch and select a desired item from a menu of items.

The position and the size of the display area 11 may be identical to those of the corresponding touch area 12. Generally, however, the touch area 12 is larger than the display area 12, as shown in FIG. 1. This is to ensure a touching operation made by a user is properly sensed by the touch panel device even if the user touches slightly outside the display area 11.

In practice, when a user intends to press the touch area 12 on the touch panel 10 with his finger, the user's finger sometimes touches not only the touch area 12 but also another area of the display screen, because fingers have various shapes, nails sometimes protrude from the fingers, and the approach direction of the finger to the touch panel affects the contact between the finger and the touch panel. As shown in FIG. 2 of the accompanying drawings, for example, if a user's finger 13 having a relatively long nail 14 presses the point A in the display area 11, the user may also unintentionally touch the point B on the touch panel with his nail 14 at the same time.

If the touch panel device is a pressure-sensitive resistance-embedded panel, the controller of the touch panel device generally utilizes an algorithm to determine a middle point of two points simultaneously touched on the panel screen 10. In case of FIG. 2, the controller of the touch panel device considers that the middle point C between the points A and B is pressed if the points A and B are pressed at the same time. As seen in FIG. 2, the point C is outside the touch area 12. The periphery of the touch area 12 defines an outer boundary of the effective touching range. Thus, a desired operation is not triggered although the user believes that the user has pressed the intended display area 11. In fact, the finger 13 presses the point A in the touch area 12, but the touch panel device does not operate.

To prevent such inconveniences, each touch area 12 may be simply expanded. However, if the larger touch areas 12 are used, the number of menu boxes 11 is reduced. In addition, the spacing between the adjacent touch areas 12 becomes small, so that the user may touch an unintended touch area 12, i.e., the possibility of incorrect operations increases.

SUMMARY OF THE INVENTION

An object of the present invention is to provide a touch panel device with improved operability, which can reduce the possibility of incorrect operations.

According to one aspect of the present invention, there is provided a touch panel device for an electronic device, comprising: a touch panel screen including a plurality of display areas and a plurality of touch areas such that each display area is associated with each touch area, each display area displaying data and information; a pressure detector for detecting a pressure applied to each of the touch areas to generate a detection signal representing the applied pressure; a signal generator for generating an operation command based on the detection signal, the operation command being used to control the electronic device and/or the touch panel device; and a relative relation adjuster for adjusting a relative relation between the display area(s) and the associated touch area(s) in terms of at least one of positional relationship and size relationship between the display area(s) and the associated touch area(s) in accordance with a predetermined condition.

Since the relative positional relationship and/or size relationship between the display area(s) and the touch areas(s) is adjusted, the touch panel device can improve operability and reduce the possibility of incorrect operations.

BRIEF DESCRIPTION OF THE DRAWINGS

FIG. 7A illustrates an enlarged diagram of an area 7A in FIG. 7.

FIG. 9A illustrates an enlarged view of an area 9A in FIG. 9.

FIG. 10 is a flowchart used to determine a relative positional relationship between display areas and touch areas on the touch panel screen.

DETAILED DESCRIPTION OF THE INVENTION

A touch panel device according to one embodiment of the present invention will be described with reference to the accompanying drawings.

Figure 3:
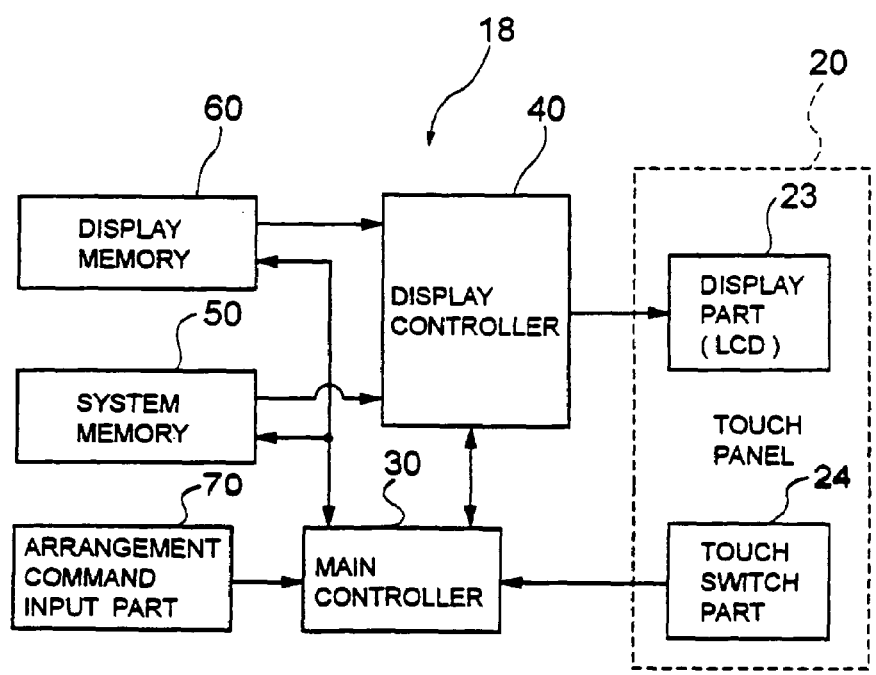
FIG. 3 is a block diagram of a touch panel device according to one embodiment of the present invention.

Referring to FIG. 3, the touch panel device 18 is used in an electronic device for an automobile such as a car navigation device and a car stereo. The touch panel device 18 may be used in any device on a vehicle, as long as a user can see and reach a display screen of the touch panel device 18 to operate the touch panel device 18. Therefore, the block diagram of FIG. 3 illustrates only parts of the touch panel device 18, and other parts of the electronic device are not illustrated. The touch panel device 18 includes a touch panel 20, a display control circuit 40, a main control unit 30, a display memory 60, a system memory 50 and an arrangement command entry unit 70.

The touch panel 20 includes a display part 23 having an LCD layer or an organic EL display layer, and a touch switch part 24 having a touch sensor layer. The touch switch part 24 is provided on top of the display part 23. The main controller 30 is connected to the touch switch part 24, and the display control circuit 40 is connected to the display part 23. The controller 30 is also connected to the display control circuit 40. The display memory 60 and the system memory 50 are connected to the display controller 40. The arrangement command input unit 70 is connected to the main controller 30.

Figure 4:
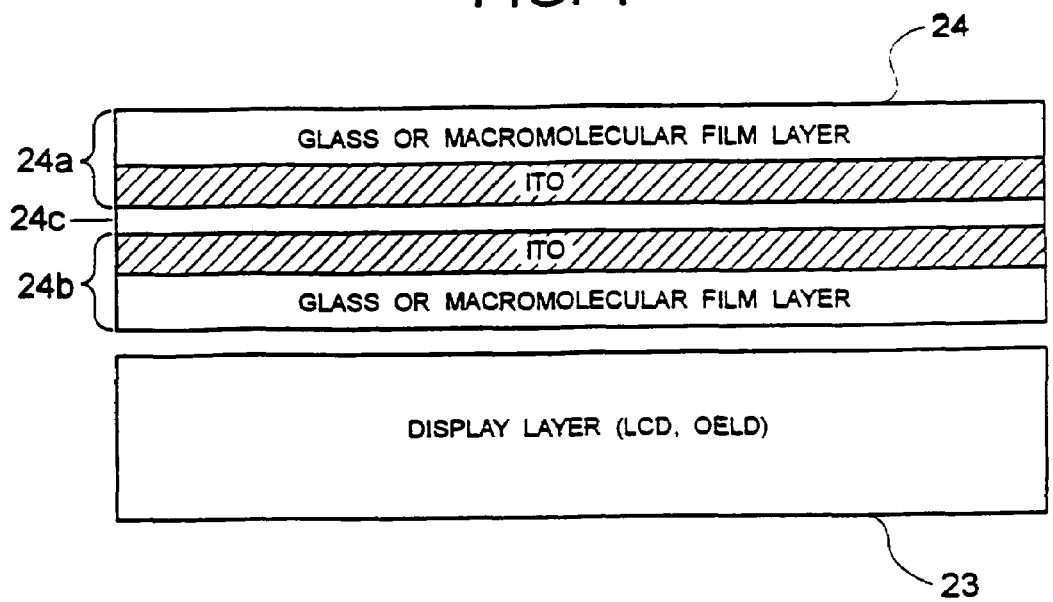
FIG. 4 illustrates a schematic cross sectional view of the touch panel screen shown in FIG. 3.

Referring to FIG. 4, the structure of the touch panel 20 is schematically shown in the cross sectional view. The display part 23 includes a display circuit of the active matrix type, and a driver circuit for the display circuit. The display circuit has, for example, organic EL elements as light-emitting elements. The display part 23 displays a certain menu screen in response to a control signal provided from the display controller 40 (FIG. 3). The menu screen presents a plurality of operation buttons.

In this embodiment, the touch panel 20 includes a touch sensor of the pressure-sensitive, resistance-embedded type (a resistance film type), which is the most popular touch sensor. Thus, the touch switch part 24, as shown in FIG. 4, includes two transparent resistance layers, i.e., an upper resistance layer 24a and a lower resistance layer 24b. The upper and lower resistance layers 24a and 24b are arranged facing each other via an intermediate layer (insulation layer) 24c in a direction perpendicular to the screen surface of the touch panel. The resistance layer 24a/24b is, for example, a glass sheet or a macromolecular film having an ITO (Indium-tin oxide) deposited thereon.

Figure 5:
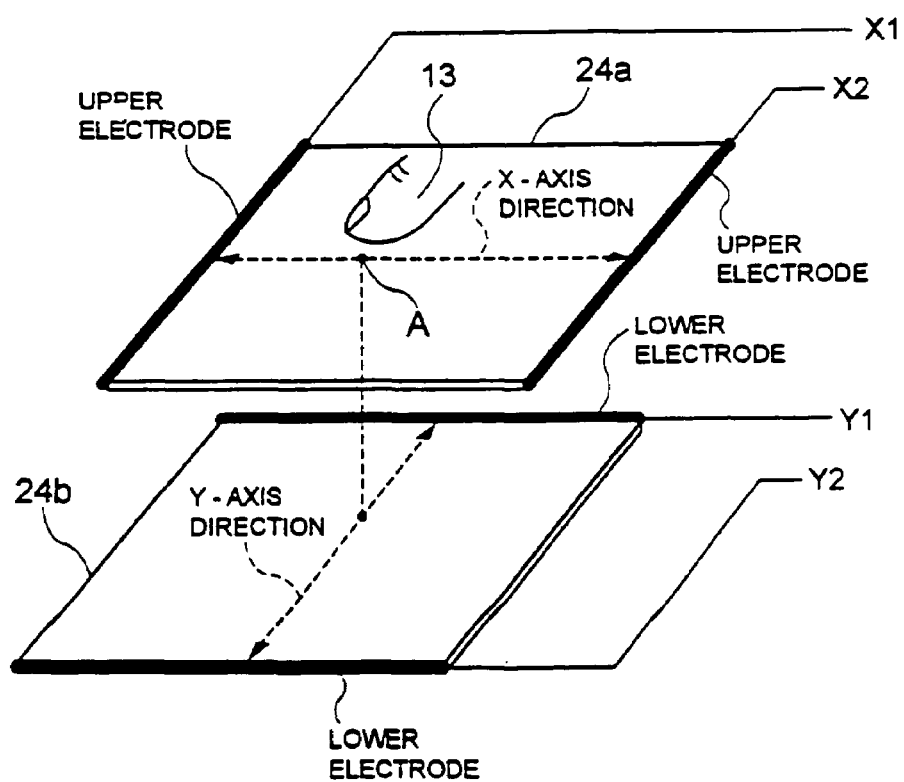
FIG. 5 illustrates an exploded diagram of a touch switch part shown in FIG. 4.

The principle of operation of the touch switch part 24 will be described with reference to FIG. 5. The upper resistance layer 24a has a pair of upper electrodes X1 and X2, and the lower resistance layer 24b has a pair of lower electrodes Y1 and Y2. The direction between the upper electrodes X1 and X2 is referred to as the X-axis direction in FIG. 5. When a voltage is applied between the upper electrodes X1 and X2, a potential gradient is produced in the X-axis direction between the electrodes X1 and X2 on the upper resistance layer 24a. Since the resistance value of the upper resistance layer 24a is uniform, the potential gradient has a generally constant inclination in the X-axis direction. When the point A on the upper resistance layer 24a is pressed by a user's finger 13, the upper resistance layer 24a is forced to contact the lower resistance layer 24b at the pressed position A. Then, the electric potential at the point A on the upper resistance layer 24a is transferred to the lower resistance layer 24b, and the same voltage value as the point A is detected between the electrodes Y1 and Y2 of the lower resistance layer 24b. The main controller 30 (FIG. 3) includes an analog-digital converter and converts the detected electric potential to a digital value. The main controller 30 calculates the position of the point A in the X-axis direction on the upper resistance layer 24a from the detected (digitized) electric potential by utilizing the fact that the potential gradient is constant.

The position A in the Y-axis direction is determined in a similar manner. Specifically, an electric potential is applied between the lower electrodes Y1 and Y2, the electric potential at the position A is detected between the upper electrodes X1 and X2, and the main controller 30 determines the position of the point A in the Y-axis direction. After that, the controller 30 determines the coordinate value of the pressed point A on the touch panel from the calculated positions in the of the X-axis and Y-axis directions.

The main controller 30 includes a microcomputer (hereinafter referred to as "μ CPU") and peripheral circuitry, and controls the entire operation of the touch panel device 18.

The display controller 40 controls a luminescent display circuit of the display section 23, and comprises another μ CPU dedicated for display control, an address control circuit for the luminescent display circuit, and peripheral circuitry. It should be noted that the present invention is not limited to the configuration shown in FIG. 3. For instance, the display controller 40 may be included in the main controller 30.

The system memory 50 comprises memory elements such as a ROM (Read Only Memory) and a RAM (Random Access Memory), and peripheral circuitry. The ROM in the system memory 50 stores a main program, which controls an operation of the touch panel device 18, and subprograms. The μ CPUs of the main controller 30 and the display controller 40 respectively perform control operations by executing the programs step-by-step in synchronization with respective clocks. The RAM temporarily stores contents of registers and flags during execution of the programs.

The display memory 60 is also a memory circuit comprising memory devices such as a ROM and a RAM, and peripheral circuitry. In the ROM of the display memory 60, various menu screens that can be displayed on the touch panel 20 are stored in the form of pixel data. The display controller 40 selects one menu-screen from a plurality of menu screens stored in the display memory 60, in accordance with a command from the controller 30, and then displays the menu screen on the display section 23 in the touch panel 20.

The arrangement command input part 70 includes data/information entry buttons, keys or the like, such as numeric and function keys, provided on a console of the vehicle electronic device (e.g., a car navigation apparatus or a car stereo). A user can determine (change) the arrangement of the display areas and the touch areas on the touch panel 20 using the arrangement command input part 70.

It should be noted that the present invention is not limited to the above described configuration. For example, the touch switch part 24 of the touch panel 20 may also be used as the arrangement command entry unit 70. Further, a reader for a portable recording medium, such as a memory card and a memory stick, may be utilized as the arrangement command entry unit 70 so as to make it possible to read arrangement data/information from the memory card or stick carried by the user.

Now, the operation of the touch panel device 18 will be described.

One of the features of the touch panel device 18 is offsetting of the touch areas from the display areas (or vice versa). That is, the center of each display area is deviated (shifted) from the center of the corresponding touch area.

Figure 6:
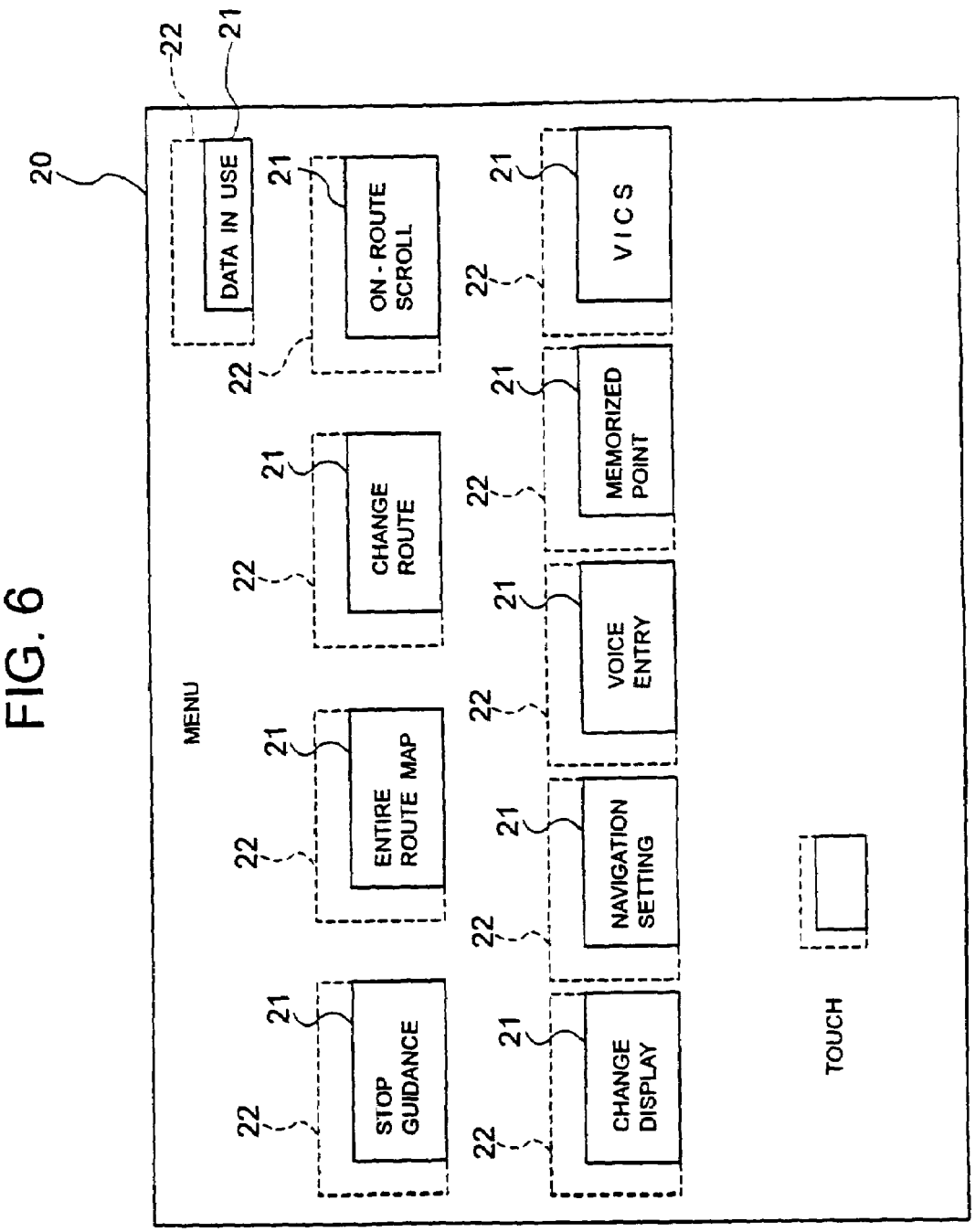
FIG. 6 illustrates one example of a touch panel screen of the touch panel device according to the present invention.

FIG. 6 shows one example of the display screen of the touch panel device 18. Each solid-line box 21 designates the display area and each broken-line box 22 designates the touch area. Certain data/information is displayed in each display area 21. The solid line rectangle for the display area 21 is visible to the user, but the broken line rectangle for the touch area 22 is not visible.

As seen in FIG. 6, each touch area 22 is offset towards the upper left from the associated display area 21. This arrangement of the display areas 21 and touch areas 22 is believed to be advantageous when the user is a driver of a right-hand drive vehicle, the touch panel 20 is mounted at the approximate center of a console, and the touch panel device 18 is situated on the left front of the driver. It is assumed that an elbow of the driver on a seat is positioned below the touch panel 20.

Figure 7:
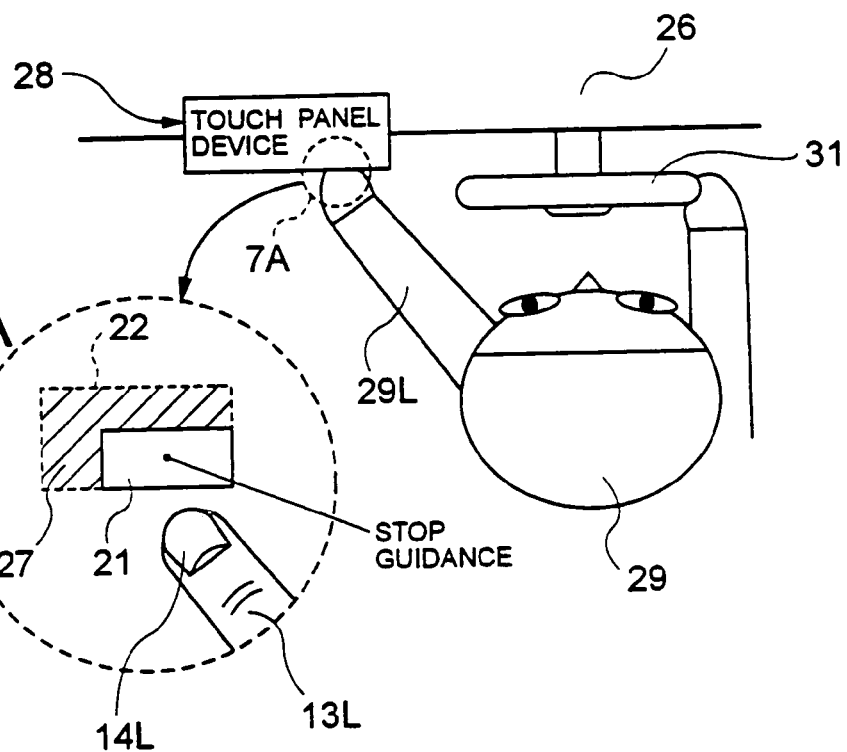
FIG. 7 illustrates a plan view of the touch panel device mounted in a right-hand drive vehicle.

In the right-hand drive vehicle as shown in FIG. 7, the electronic device 28 such as a car navigator is usually mounted at the center of a console 26. Thus, the touch panel device 18 of the electronic device 28 is situated on the left front side of the driver 29 above the driver's elbow. When the driver 29 operates the touch panel device 18, the driver 29 most probably uses the index finger (fore finger) or the middle finger of the left hand as the panel pressing finger. The driver 29 tries to reach the touch panel device 18 by extending the left arm 29L such that the finger 13L moves from the lower right side of the touch panel device 18 towards a desired display area 21 on the touch panel screen.

Figure 2:
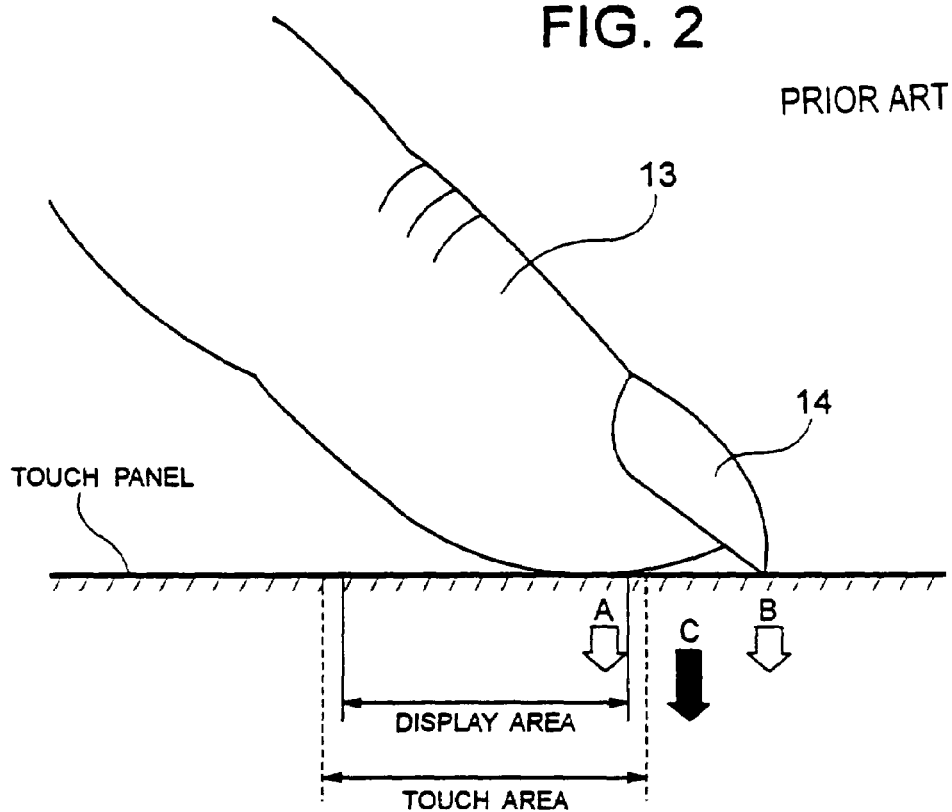
FIG. 2 shows a surface of the touch panel screen when a user presses the touch panel screen with a finger and a nail.

In this case, as shown in the enlarged view (FIG. 7A), an area that is most probably touched by the driver's finger 13L is the desired display area 21 or the upper and left peripheral areas (shaded area) 27 outside the display area 21 on the touch panel 20. This is because the finger 13L is moving in the upper left direction. If the touch panel screen is simultaneously touched by the finger 13L and the nail 14L as shown in FIG. 2, it is assumed that the middle point C between the two touched points A and B falls in the shaded area 27 outside the display area 21.

Accordingly, each touch area 22 is shifted in the upper left direction relative to the display area 21 as shown in FIG. 6, such that the touch area 22 coincides with the combination of the display area 21 and the shaded area 27 (FIG. 7). Therefore, even if the driver touches the touch panel screen outside a desired button (display area) 21, the possibility of triggering a desired operation increases, as compared with the conventional touch panel device shown in FIG. 1. In particular, even if the driver's nail 14L is relatively long, the middle point C probably falls in the touch area 22 so that an intended operation is started. The touch area 22 of the touch panel device 18 has the same size as the touch area 12 shown in FIG. 1. Therefore, the touch panel 20 can display the same number of items on the screen as the touch panel device of FIG. 1.

Figure 8:
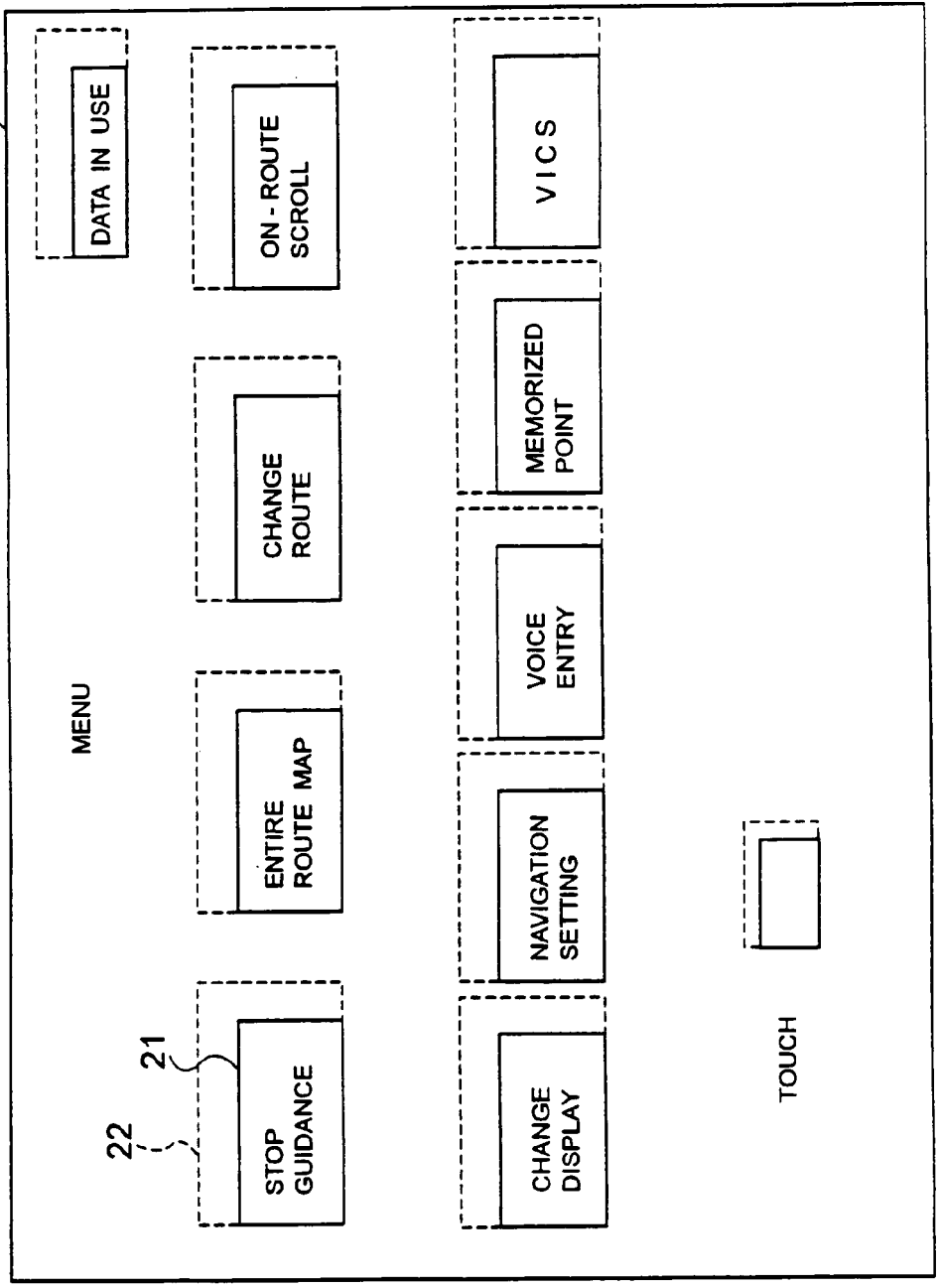
FIG. 8 shows another example of the touch panel screen of the touch panel device according to the present invention.

Another arrangement of the display areas 21 and touch areas 22 is shown in FIG. 8.

Figure 9:
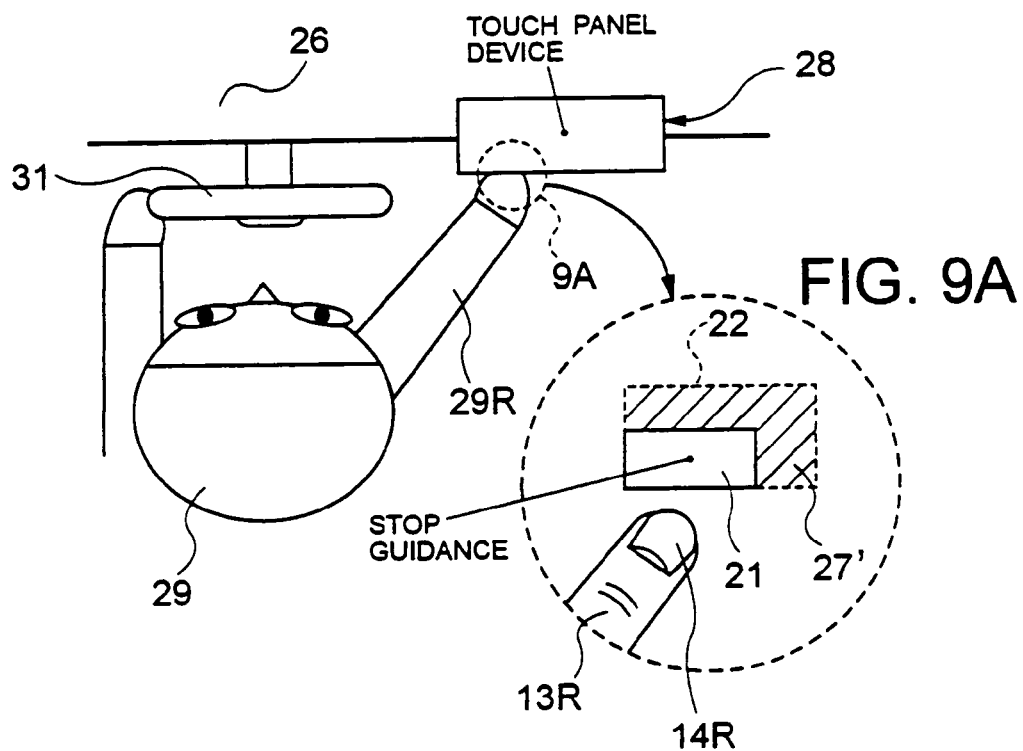
FIG. 9 shows a plan view of the touch panel device mounted in a left-hand drive vehicle.

In FIG. 8, each touch area 22 is offset towards the upper right relative to the corresponding display area 21. This arrangement of the display areas 21 and touch areas 22 is considered to be advantageous when the vehicle is a left-hand drive vehicle as shown in FIG. 9. The touch panel device 18 is mounted at the center of the console 26. When the driver 29 is seated, the touch panel device is located at the right front of the driver 29. The touch panel device 18 is above the elbow of the seated driver.

When the driver 29 operates the electronic device 28, the driver 29 generally uses the index finger or the middle finger 13R of his right hand to touch the touch panel device 18. When the driver 29 tries to touch the touch panel screen 20, the finger 13R moves from the lower left side of the touch panel device 18 towards the touch panel device 18. In this case, as shown in FIG. 9A, it is assumed that the display area 21 and the shaded area 27' are most probably touched by the driver 29 when the driver intends to touch the display area 21. This assumption is established based on human engineering. The shaded area 27' extends in the upper and right peripheral areas of the display area 21. If the touch panel screen is simultaneously touched by the finger 13R and the nail 14R as shown in FIG. 2, the middle point C between the two touched points A and B falls in the shaded area 27'.

Accordingly, as shown in FIG. 8, if the touch area 22 is offset towards the upper right direction relative to the display area 21 such that the touch area 22 coincides with the combination of the display area 21 and the shaded area 27', an erroneous operation of the driver is prevented. The same advantage as the example shown in FIG. 6 is achieved.

Figure 1:
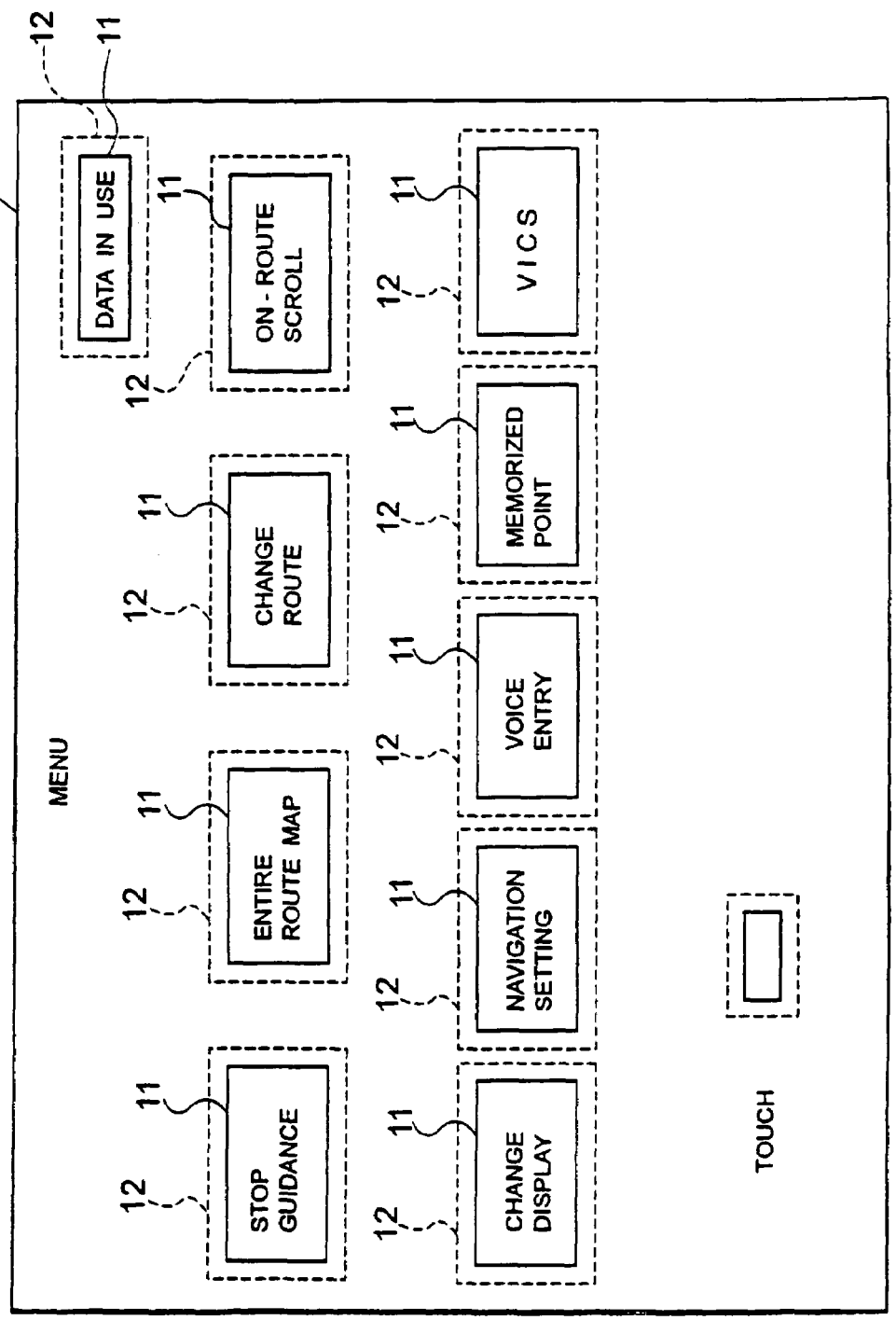
FIG. 1 shows a touch panel screen of a conventional touch panel device.

Since the size and resolution of the display area 21 are different from the size and resolution of the touch area 22 on the touch panel 20, the main controller 30 of the touch panel device 18 performs the matching operation. Specifically, the main controller 30 calculates the ratio of the resolution of the display layer in the display part 23 to the output resolution of the touch sensor layer in the touch switch part 24. The main controller 30 then conforms the display area 21 with the touch area 22, using the calculated resolution ratio. In order to maintain the relative positional relationship between each pair of display area 21 and touch area 22 on the display panel 20 during the operation of the touch panel device 18, a process shown in FIG. 10 is performed within a common calibration process implemented in the touch panel device 18. As shown in the flowchart of FIG. 10, the main controller 30 of the touch panel device 18 receives the information of the desired relationship between the display areas 21 and the touch areas 22 from the system memory 50 (Step S1). Then, the main controller 30 determines whether the vehicle is a right-hand drive (Step S2). If the vehicle is right-hand drive, the main controller 30 maintains the touch area 22 in the upper left offset position (Step S4). If the vehicle is a left-hand drive (Yes at Step S3), the main controller 30 maintains the touch area 22 in the upper right offset position (Step S5). If the steering wheel 31 of the vehicle is located in the middle of the vehicle, the touch area 22 is not offset from the associated display area 21 (Step S6), as shown in FIG. 1.

The information of the desired relationship between the display areas 21 and the touch areas 22 (Step S1) may be input into a nonvolatile RAM of the system memory 50 by the driver using the arrangement command entry unit 70. Alternatively, the information may be entered by a serviceman of an automobile dealer when the vehicle is purchased, as an initial setting of the touch panel device 18.

Although the touch area 22 is offset to the upper left direction or the upper right direction in the illustrated embodiments, the present invention is not limited in this regard. Specifically, the touch area 22 can be offset in any direction (to the right, the left, the lower right, the lower left, or downwards) relative to the associated display area 21, depending upon the positional relationship between the touch panel device user and the touch panel device. Further, the touch areas 22 may be fixed and the display areas 21 may be shifted.

In addition to or instead of the offset arrangement between the display areas 21 and the touch areas 22, the display areas 21 and/or the touch areas 22 may be changed in size and/or shape. That is, at least either the relative positional relationship or the relative size relationship between the display areas and touch areas is adjustable in this invention. The change made to the relative relationship between the display areas and touch areas may be determined based on ergonomics.

This application is based on a Japanese patent application No. 2002-153221, and the entire disclosure thereof is incorporated herein by reference.

What is claimed is:

1. A touch panel device for an electronic device, comprising:
    a touch panel screen including a plurality of display areas and a plurality of touch areas such that each display area is associated with each touch area, each display area displaying information;
    a detector for detecting an application to one or more of the touch areas to generate a detection signal;
    a signal generator for generating an operation command based on the detection signal; and
    a relative relation adjuster for adjusting a relative relation between at least one display area and the associated touch area in accordance with a predetermined condition so that a center of the touch area is offset from a center of the associated display area in the same direction as the approach direction of a user's input touching operation.

2. The touch panel device according to claim 1 further comprising an input unit that allows a user to enter the predetermined condition.

3. The touch panel device according to claim 2, wherein the input unit is one of the plurality of display areas and an associated touch area defined on the touch panel screen.

4. The touch panel device according to claim 1, wherein the relative relation adjuster offsets the center of the display area from the touch area, or vice versa, based on ergonomics.

5. A display/input device provided in an automobile having a steering wheel, the display/input device comprising:
    a touch panel unit;
    the touch panel unit including:
    a touch panel screen including a plurality of display areas and a plurality of touch areas such that each display area is associated with each touch area, each display area displaying information,
    a detector for detecting an application to one or more of the touch areas to generate a detection signal,
    a signal generator for generating an operation command based on the detection signal, and
    a relative relation adjuster for offsetting a center of a touch area from a center of an associated display area in accordance with a steering wheel position so that a center of the touch area is offset from a center of the associated display area in the same direction as the approach direction of a user's input touching operation.

6. The display/input device according to claim 5, wherein the relative relation adjuster offsets the center of the touch area at least leftward or upwards from the center of the display area, when the automobile is a right-hand drive automobile.

7. The display/input device according to claim 6, wherein the touch area is a larger size than the display area, and the touch area overlaps the entire display area even after the touch area is offset.

8. The display/input device according to claim 5, wherein the relative relation adjuster offsets the center of the display area at least rightwards or downwards from the center of the associated touch area, when the automobile is a right-hand drive automobile.

9. The display/input device according to claim 8, wherein the touch area is a larger size than the display area, and the touch area overlaps the entire display area even after the display area is offset.

10. The display/input device according to claim 5, wherein the relative relation adjuster offsets the center of the touch area at least rightwards or upwards from the center of the display area, when the automobile is a left-hand drive automobile.

11. The display/input device according to claim 10, wherein the touch area is a larger size than the display area, and the touch area overlaps the entire display area even after the touch area is offset.

12. The display/input device according to claim 5, wherein the relative relation adjuster offsets the center of the display area at least leftward or upwards from the center of the touch area, when the automobile is a left-hand drive automobile.

13. The display/input device according to claim 12, wherein the touch area is a larger size than the display area, and the touch area overlaps the entire display area even after the display area is offset.

14. The display/input device according to claim 5, wherein the relative relation adjuster offsets the center of the touch area from the display area, or vice versa, based on ergonomics.

15. The touch panel device according to claim 1, wherein the touch area, after offsetting, covers an entire surface of the associated display area.

* * * * *